United States Patent Office 3,697,292
Patented Oct. 10, 1972

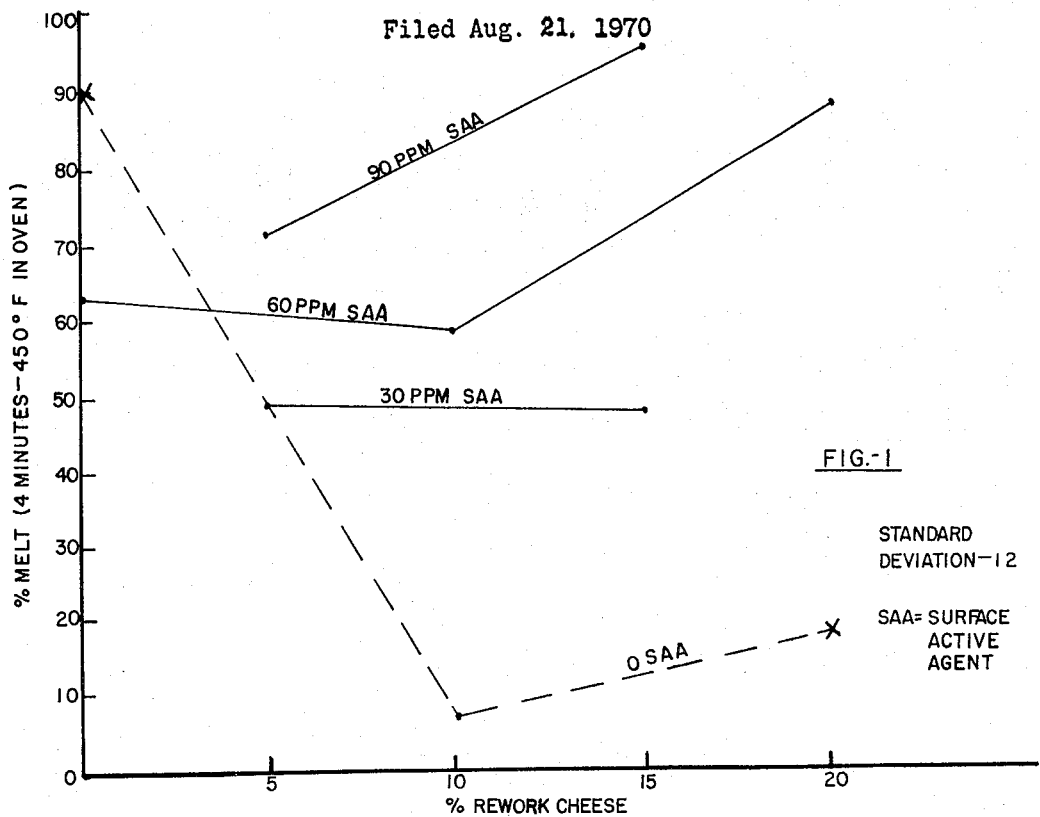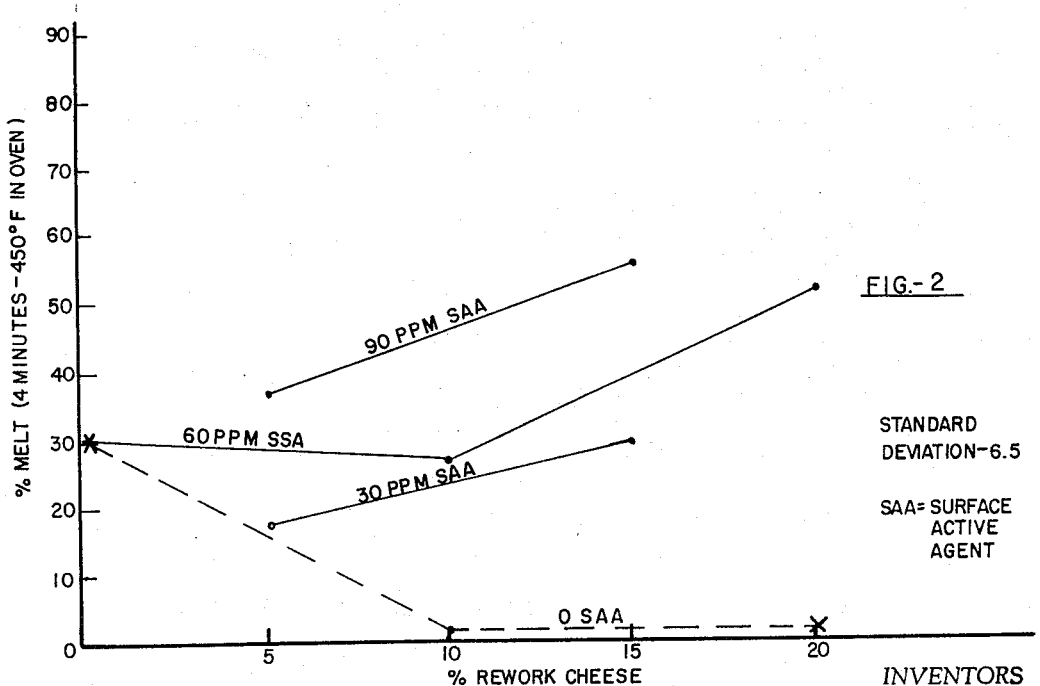

3,697,292
USING SALVAGE CHEESE IN PREPARING
PASTEURIZED PROCESS CHEESE
Robert M. Lauck, New City, N.Y., assignor to
Stauffer Chemical Company, New York, N.Y.
Continuation-in-part of application Ser. No. 812,916, Apr. 2, 1969, which is a continuation-in-part of application Ser. No. 553,633, May 31, 1966. This application Aug. 21, 1970, Ser. No. 65,823
Int. Cl. A23c *19/00, 19/12*
U.S. Cl. 99—115                                  18 Claims

ABSTRACT OF THE DISCLOSURE

Extrudable pasteurized process cheese utilizing large quantities of salvage cheese can be prepared by incorporating in the blend of the raw cheese, salvage cheese and usual process cheese emulsifiers, from about 0.00015% to about 2%, by weight, of a surface-active agent.

CROSS-REFERENCE TO RELATED APPLICATION

This application is a continuation-in-part of copending application Ser. No. 812,916, filed Apr. 2, 1969 which is a continuation-in-part of application Ser. No. 553,633, filed May 31, 1966, both now abandoned.

This invention relates to pasteurized process cheese compositions and more particularly to methods for efficiently utilizing salvage cheese or rework cheese in process cheese compositions.

Pasteurized process cheese or process cheese is normally a blend of two or more lots of raw cheese that are comminuted or ground and mixed together by stirring and heating. The most common variety processed in the United States is the Cheddar (or American cheese), but process cheese is also made with Swiss, Limburger, Brick, Camembert, and other varieties as well. The "process cheese" method allows for the use of various varieties of raw cheese, or the use of cheeses of varying degrees of quality or ripeness in preparing a final product having a substantially consistent quality.

Process cheese has the advantage of being able to utilize otherwise defective cheese in preparing a quality product. In addition, process cheese has many advantages over natural cheese, particularly in the area of cooking and preparing cooked cheese foods. Process cheese melts smoothly and quickly without fat separation or stringiness. Because process cheese is or can be a mixture of various varieties of cheese, balanced flavors and textures can be produced. The most important quality of process cheese is its excellent keeping qualities. The natural ripening process varies as to the type of cheese. The ripening of the cheese past its prime produces distinctive off-flavors. Deterioration or drying out of raw cheese is a problem avoided by processing.

In addition, process cheese has become very popular with consumers who are attracted by its flavor and attractive packaging. Because of processing, it is now possible to purchase cheese in 1 and 2 pound blocks as well as in individually wrapped cheese slices which are extensively used for sandwiches, particularly grilled cheese sandwiches and cheeseburgers. Retailers also benefit from processing due to reduced loss due to spoilage and shrinkage in weight as well as easier merchandizing of the cheese.

Process cheese is generally prepared by grinding raw cheese into a cheese cooker. Considerable skill is required at this point to select the cheeses needed to provide the proper balance of age and flavor characteristics to insure uniformity of the final cheese product. Water, color, seasoning and an emulsifier and, if desired, flovoring materials such as pimento and spices are added. Federal Standards of Identity for process cheese as set up by the U.S. Department of Agriculture regulate the percentage of water as well as other materials which can be present in a cheese product sold as "process cheese." These standards are publicly known and can be found in the Code of Federal Regulations, title 21, Chapter 1, Paragraph 19.750 entitled "Pasteurized Process Cheese; Identity; Label Statement of Optional Ingredients."

A process cheese emulsifier is added to the raw cheese to prevent the separation of fat during processing as well as to obtain desirable properties of melting and slicing in the end product. Disodium phosphate, sodium citrate or tartrate, sodium pyrophosphate, sodium metaphosphate, sodium aluminum phosphate, and Rochelle Salts or mixtures thereof are generally used. As presently limited by the U.S. Department of Agriculture, process cheese contains only a small amount of emulsifying agents, not exceeding 3% of the total weight of the finished product. These emulsifiers are quite limited as a class as reported attempts to utilize surface active agents in place of or in combination with the emulsifiers failed to provide a usable product. The acidity of the cheese may be controlled by the addition of food grade acids such as acetic, citric, lactic, and phosphoric, provided the pH of the cheese is not less than 5.3.

After mixing, the cheese (according to Federal Standards) must be heated to not less than 150° for 30 seconds. At this temperature the cheese becomes plastic and flows readily. At this point the liquid cheese is then passed through a series of conduits to the packaging operation. There, the cheese is extruded through an orifice onto a refrigerated conveyor belt or between a pair of refrigerated rolls and the cast or extruded sheets of cheese are cut and stacked on one another to produce the desired thickness. After stacking, the cheese is weighed and cut into desired thickness. After stacking, the cheese is weighed and cut into the desired size and weight for packaging. Approximately 2 to 15% of the cheese is unsaleable because it is either above or below the desired weight and size, or because it constitutes shavings removed in the cutting operations. For economic reasons, this salvage cheese must be reworked later into fresh batches of raw cheese. Cheese manufacturers, and particularly the smaller manufacturers must use the salvage cheese or be at such a competitive price disadvantage as to force them out of business. However, the use of this salvage cheese often causes considerable difficulty in the preparation of process cheese. Normally, reheated materials become soft and pliable. Cheese, however, thickens upon reheating. This thickening of the salvage adversely affects the consistency of the fresh process cheese melt so that the flow of the process cheese through the conduits is uneven and extrusion is made difficult. Variations in quality of both the raw cheese and the salvage cheese have an adverse effect on overall operation of the process. Moreover, the cheese tends to adhere to the hoppers, cookers, and to partially block the extrusion apparatus. Cooker build-up which occurs at the end of the day in some plants can also adversely influence the raw cheese-salvage cheese blends. The end result is that the cheese is not uniform in thickness or weight and the cutting machines are unable to cut uniform pieces for packaging.

Besides the packaging difficulties, process cheese containing salvage process cheese is often of inferior quality in that wavy lines are present in the cheese, a condition known as "alligator back," and in addition the elasticity of the cheese is reduced, often resulting in a poor, uneven or jagged break when separated.

It has now been discovered that these problems of utilizing salvage process cheese in raw cheese blends containing the normal process cheese emulsifiers may be obviated by mixing a small proportion of surface-active agent with the raw cheese and salvage process cheese blend. It has also been discovered that up to 100% salvage process cheese can be reprocessed to provide an acceptable process cheese by the incorporation of the surface-active agents in the rework cheese. It has also been surprisingly observed that the salvage process cheese effect can be reversed. Thus, additions of salvage process cheese can, under certain conditions be used to increase melt rather than decrease melt. This situation is unexpected and unexplainable.

In the drawings, FIGS. 1 and 2 are comparative representations of the effect of a surface active agent on cheese systems containing varying amounts of rework or salvage process cheese as determined by a melt test. The results of FIG. 1 are based on tests after 3 weeks of storage of the cheese samples. FIG. 2 is based on results obtained after 2 months storage of the same samples. The specific data is tabulated in Table IV presented hereinafter.

Most of the surface-active agent compounds used in the invention have been previously used as emulsifiers in pastry and various bread products but it is clear that they do not serve as emulsifiers in the compositions of the invention. This is evident since these compounds tend to decrease fat stability while true emulsifiers increase fat stability. How these surface-active agents work is not understood. Prior attempts to use surface-active agents, with or without emulsifiers, in the preparation of process cheese solely from raw cheese have failed. However, and in the present invention, fat bodies are released, rendering the cheese soft and pliable so that it may easily be passed through conduits to the packaging operation. One may also easily separate individual sliced pieces of the cheese due to the slight fat separation. Moreover, the desired texture of the cheese is retained upon reheating so that the cheese spreads readily. This quality renders the cheese ideal for use in all areas where process cheese is used, particularly where melt qualities are important, such as in toasted cheese sandwiches and in cheeseburgers.

The surface-active agents which are used are intermixed with the usual ingredients found in cheese, including the usual emulsifiers. These emulsifiers, which may be used alone or in mixtures, include the following: monosodium phosphate, disodium phosphate, dipotassium phosphate, trisodium phosphate, sodium metaphosphate (sodium hexametaphosphate), sodium acid pyrophosphate, tetrasodium pyrophosphate, sodium aluminum phosphate, sodium citrate, potassium citrate, calcium citrate, sodium tartrate and sodium potassium tartrate. The emulsifier is basically required for processing raw cheese. The amounts utilized are generally based on the raw cheese present in the cheese which is being processed. Any salvage cheese used already contains emulsifiers from its original processing. However, the total amount of emulsifier present in the final product must not exceed the specifications set forth in the Federal Regulations for process cheese which are now set at 3%. The total concentration of emulsifier can vary as low as about 0.5% and be as high as the legal limit of 3% though amounts over 3% can be used if legally acceptable. The foregoing percentages are by weight, based on the weight of the final cheese.

A suitable range for these surface-active agents is between about 0.00015% and 2%, by weight, of the raw cheese including the salvage process cheese. The amount preferred in any given case will, of course, depend upon the particular surface-active agent, the raw cheese selected and the quality of the salvage process cheese, but will generally lie between about 0.0003% and 1%. The range of surface-active agent of from about 0.0003 to about 1% is particularly effective in cheese mixtures containing from about 0.5% to about 50% salvage process cheese.

The surface-active agents which can be utilized in the present invention can be illustrated by:

(a) phosphorylated substituted and unsubstituted sorbitan fatty acid monoesters and their alkali metal salts wherein the fatty acid contains from 12 to 18 carbon atoms;

(b) phosphorylated substituted and unsubstituted polyoxyethylene sorbitan fatty acid esters and their alkali metal salts wherein the average monomer chain length is from 4 to 50 and the fatty acid contains from 12 to 18 carbon atoms;

(c) polyoxyethylene fatty acid esters wherein the average monomer chain length is from 4 to 50 and the fatty acid contains from 12 to 18 carbon atoms;

(d) alkyl and alkoxy substituted phosphates wherein the substituent contains from 12 to 18 carbon atoms;

(e) substituted and unsubstituted monoglycerides wherein the fatty acid contains from 12 to 18 carbon atoms and the substituent is selected from the group consisting of acetylated tartaryl and phosphoryl;

(f) lecithin;

(g) the alkali metal salts of $C_4$ to $C_{20}$ aliphatic esters of sulfosuccinic acid; and (h) mixtures thereof.

These materials can be used alone or in admixtures. Some representative examples include the following: phosphorylated stearoyl monoglyceride, distilled (90%) monoglycerides made from hydrogenated lard, acetylated tartaric monoglycerides of vegetable fat, mixtures of phosphatides occurring naturally in soybean oil and comprising in a major proportion phosphatidyl choline, phosphatidyl ethanol amine and inositol phosphatides known commercially as lecithin, sorbitan monostearate sodium palmitoyl sorbitan orthophosphate, sorbitan monopalmitate, palmitoyl sorbitan orthophosphate, sorbitan monolaurate, sodium stearoyl sorbitan orthophosphate, sodium lauroyl sorbitan orthophosphate, lauroyl sorbitan orthophosphate, stearyl acid orthophosphate, palmityl acid orthophosphate, lauryl acid orthophosphate, propoxylated lauryl polyphosphate, tris (phosphoryl) polyoxyethylene(20) sorbitan monolaurate, and tris (phosphoryl) polyoxyethylene(20) sorbitan monostearate.

The preferred surface-active agents are represented by the following: polyoxyethylene(4) sorbitan monolaurate, polyoxyethylene(5) sorbitan mono-oleate, polyoxyethylene(20) sorbitan mono-oleate, polyoxyethylene(20) sorbitan monostearate, polyoxyethylene(20) sorbitan monopalmitate, polyoxyethylene(20) sorbitan monolaurate, polyoxyethylene(8) stearate, polyoxyethylene(40) stearate, polyoxyethylene(50) stearate, polyoxyethylene(20) palmitate, polyoxyethylene(8) laurate, diisobutyl sodium sulfosuccinate, di-n-octyl sodium sulfosuccinate and di-2-ethylene sodium sulfosuccinate.

The following examples will serve to illustrate the invention but should not be construed as unduly limiting thereof.

EXAMPLE 1

500 gm. of a raw cheese blend containing 34% water and comprising 40% of an American cheese having a pH=5.25, 40% of an American cheese having a pH=5.30, and 20% of an American cheese having a pH=5.02 was selected. The cheese was ground, frozen to inhibit bacterial action, thawed at room temperature and equilibrated by storing in a refrigerator prior to the following experiment.

The bowl of a Brabender Plastograph was adjusted to a temperature of 80° C. and the sigma blades were rotated at 150 "envelopes" per minute. Steam was then passed into the bowl at a rate sufficient to supply approximately 25 ml. of water to the hereinafter mentioned mixture. About one quarter of the raw cheese was added, followed by 17.5 gm. of sodium aluminum phosphate, 2.5 gm. of salt, the remainder of the raw cheese and 37 ml. of water. To this mixture was then added 100 gm. (20% based on weight of raw cheese) of good melt salvage cheese having a pH=5.87, Bloom Gelomotor Reading of 220 and a melt percent of 49. The batch was cooked for three minutes and then removed from the bowl and placed in 150 ml. glass beakers. A paraffin lid was placed on the beakers and the beakers were placed in a refrigerator. After cooling overnight and equilibrating at room temperature, a sample was subjected to the Bloom Gelomotor and Melt Tests. The Bloom Gelomotor reading, hereinafter referred to as the Bloom, is a measure of the hardness of cheese. The test comprises measuring the amount of lead shot required to force a $13/16''$ diameter disc a standard distance into a plug of cheese $3/4''$ thick and having a diameter of $13/16''$. Higher Bloom numbers consequently indicate harder cheese. The example cheese had a "Bloom" of 200.

The Melt Test is conducted by placing a $1/4''$ plug of cheese having a diameter of $13/16''$ in a 250 ml. stainless steel beaker and placing the beaker in a boiling water bath for 4 minutes. The diameter of the cheese plug is then measured and the percent increase in diameter reported as the melt. A melt of about 15 to 20 is acceptable but higher melts are desired. No maximum limit seems to exist. The example cheese had a melt of 12.

The following examples shown in Table I were conducted according to the procedure of Example 1 with the exception that a surface-active agent was added to the Plastograph bowl immediately following the addition of the salvage cheese. For comparison purposes in said table, the data of Example 1 is presented. It will be seen from Table I that all the compounds are effective to a greater extent in increasing melt. Moreover, most of the examples show an improvement in bend, permitting the cheese to be folded without breaking. A slight increase in fat loss on paper is also observed which permits easier separation from the paper as well as from other sliced pieces.

The examples reported in Table II were conducted in accordance with the procedure of the previous examples with the exception that salvage cheese was used which was adjusted to be of poor quality by an experienced blender. Said salvage cheese had a melt of 6, a Bloom of 500+ and a pH=6.01. Because of its poor quality, the quantity added was reduced from 20% to 2.5%, the latter being the present commercial upper limit for a satisfactory cheese product. Example 13 is a control containing no surface-active agent.

The data in Table III again reveals a manifest increase in melt and a desirable reduction in Bloom as well.

In the examples shown in Table III, procedure of the preceding examples was followed. Said examples were conducted to demonstrate the effect of a more active surface-active agent with two of the commonly used emulsifiers, disodium phosphate (DSP) and sodium citrate (SC) on process cheese containing 20% good salvage cheese. Examples 15 and 17 represent controls containing no surface-active agent.

TABLE I.—THE EFFECT OF A SURFACE-ACTIVE AGENT ON CHEESE CONTAINING 20% GOOD SALVAGE CHEESE

| Ex. No. | Surface-active agent Type | Amt. (gm.) | Melt | Bloom | Fat loss Melt | Paper | Slice | Break | Strength |
|---|---|---|---|---|---|---|---|---|---|
| 1 | None | 0 | 12 | 200 | None | Trace | Moderately smooth | Trace, jagged | Very slight. |
| 2 | Polyoxyethylene (40) monostearate | 1 | 60 | 180 | Trace | Very slight | Slightly smooth | Trace, jagged, good bend. | Do. |
| 3 | Lactylic stearate | 5 | 36 | 220 | None | do | do | do | Do. |
| 4 | Distilled (90%) monoglycerides made from hydrogenated lard. | 5 | 48 | 225 | do | do | do | Trace, jagged | Do. |
| 5 | Commercial lecithin | 5 | 52 | 185 | do | do | do | do | Do. |
| 6 | Acetylated tartrated monoglyceride of vegetable fat. | 5 | 56 | 170 | Trace | Moderate | do | do | Do. |
| 7 | Sorbitan monostearate | 5 | 71 | 193 | do | Very slight | do | Trace, jagged, good bend. | Do. |
| 8 | Stearoyl monoglyceride | 5 | 48 | 225 | None | do | do | Trace, jagged | Do. |
| 9 | Tris (phosphoryl) polyoxyethylene (20) sorbitan monolaurate. | 5 | 44 | 210 | do | do | Slightly smooth | do | Do. |
| 10 | Sodium palmitoyl sorbitan orthophosphate. | 5 | 54 | 198 | do | do | do | Straight | Do. |
| 11 | Phosphorylated stearoyl monoglyceride | 5 | 35 | 226 | do | do | do | Trace, jagged | Do. |
| 12 | Propoxylated lauryl polyphosphate | 5 | 65 | 164 | do | Moderate | do | Very slightly jagged. | Do. |

TABLE II.—THE EFFECT OF A SURFACE-ACTIVE AGENT WITH VARIOUS COMMONLY USED EMULSIFIERS

| Ex. No. | Surface-active agent Type | Amt. (gm.) | Melt | Bloom | Fat loss Melt | Paper | Slice | Break | Strength |
|---|---|---|---|---|---|---|---|---|---|
| 13 | None | 0 | 23 | 225 | None | Very slight | Slightly smooth | Straight | Very slight. |
| 14 | Polyoxyethylene (40) monostearate | 1 | 61 | 185 | Trace | do | do | Very slight | Do |

TABLE III.—THE EFFECT OF A SURFACE-ACTIVE AGENT WITH VARIOUS COMMONLY USED EMULSIFIERS

| Ex. No. | Surface-active agent Type | Amt. (gm). | Emulsifier Type | Amt. (gm.) | Melt | Bloom | Fat loss Melt | Paper | Slice | Break | Strength |
|---|---|---|---|---|---|---|---|---|---|---|---|
| 15 | None | 0 | DSP | 11.7 | 14 | 220 | None | Very slight | Slightly smooth | Trace, jagged | Very slight. |
| 16 | Polyoxyethylene (40) monostearate. | 1 | DSP | 11.7 | 25 | 170 | do | do | do | do | Do. |
| 17 | None | 0 | SC | 11.5 | 16 | 345 | do | do | Slightly rough | Very slightly jagged. | Slightly brittle. |
| 18 | Polyoxyethylene (20) sorbitan monoleate. | (1) | SC | 11.5 | 31 | 290 | Trace | do | Slightly smooth | Trace jagged | Very slightly brittle. |

[1] 1 milliliter.

The following examples shown in Table IV were prepared in a 40 pound raw cheese capacity pilot plant cheese cooker which was scaled down from commercial equipment. The basic cheese formula included, besides raw cheese and salvage cheese of similar composition as the final product, 2% by weight of sodium aluminum phosphate, and about 0.4% trisodium phosphate on a dry solids basis. The surface-active agent was di-2-ethylhexyl sodium sulfosuccinate added as a 50% solution in alcohol. The salvage cheese replaced part of the raw cheese with appropriate reduction of other ingredients. The cheese mixtures were heated to 160° F. by direct injection of steam at a pressure of 80 pounds per square inch. The cheese was mixed during cooking by a single screw rotating at 160 revolutions per minute. The cheese was formed into 2 pound and 5 pound loaves. The melt characteristics of the cheese were tested by heating plugs of the cheese on aluminum foil in a 450° F. oven for four minutes.

The following results were obtained:

TABLE IV.—THE EFFECT OF SURFACE-ACTIVE AGENT ON MELT OF CHEESE CONTAINING SALVAGE CHEESE

| Example Number | Salvage cheese, percent | Surface-active agent,[1] p.p.m. | Percent melt | | |
|---|---|---|---|---|---|
| | | | 2 lb. loaves | | 5 lb. loaves, 2 months refrigeration |
| | | | 3 weeks refrigeration | 2 months refrigeration | |
| 19 | 0 | 0 | 91 | 28 | |
| 20 | 10 | 0 | 7 | 0 | 4 |
| 21 | 5 | 30 | 50 | 17 | 4 |
| 22 | 15 | 30 | 49 | 29 | 3 |
| 23 | 0 | 60 | 63 | 30 | 4 |
| 24 | 10 | 60 | 68 | 36 | 7 |
| 25 | 10 | 60 | 62 | 27 | 5 |
| 26 | 10 | 60 | 55 | 26 | 3 |
| 27 | 10 | 60 | 34 | 14 | 6 |
| 28 | 10 | 60 | 57 | 24 | 5 |
| 29 | 10 | 60 | 72 | 28 | 6 |
| 30 | 20 | 60 | 87 | 51 | 13 |
| 31 | 5 | 90 | 72 | 37 | 9 |
| 32 | 15 | 90 | 95 | 55 | 6 |
| 33 | 10 | 120 | 69 | 42 | 19 |

[1] Di-2-ethylhexyl sodium sulfosuccinate.

As can be seen from the data which is also graphically presented in FIGS. 1 and 2, a process cheese sample with no surface-active agent and no salvage cheese (Example 19) had over a 90% melt in a 2 pound loaf after 3 weeks of refrigeration. With the addition of 10% good salvage process cheese (Example 20), the melt dropped to 7% and remained substantially at that level with the further addition of more salvage process cheese. After 2 months refrigeration, the melt dropped to 0% in comparison to 30% for the cheese containing no salvage process cheese. The addition of surface-active agent in various amounts effectively increased melt, a characteristic which remained prevalent even after extended storage time. The use of surface-active agent in the process cheese with no salvage process cheese (Example 23) did not provide any improved results. It will be noted that as the salvage process cheese level is increased while maintaining the surface-active agent at a constant amount (Examples 29 and 30, and Examples 31 and 32), melt is increased. A decrease in melt would be expected. Slightly higher amounts of surface-active agent might be required for larger, slow cooling blocks of cheese such as, for example, the 5 pound loaves.

These data are also graphically presented in FIGS. 1 and 2. Referring specifically to these drawings, it can be seen in FIG. 1 that the addition of rework or salvage process cheese decreases the melt by more than 80% (dash line). Addition of 30 parts per million of surface active agent reduced the negative effect of the salvage process cheese by one half. Further additions of surface active agent brought further decreases in the negative effect of the salvage process cheese. Surprisingly, it has been found in this system that there is a point at which the rework or salvage process cheese effect is actually reversed. In samples having melts above 63% melt, it has been found that the addition of increased percentages of salvage process cheese, while maintaining the amount of surface-active agent constant, will provide an increased melt. This is clearly shown by the graphs of FIGS. 1 and 2. It would be expected, based on the general effect which salvage process cheese has on the system, that the percent melt would decrease or at least stay the same. It is also noted that it is possible to achieve melts equivalent to or better than process cheese prepared solely from raw cheese. It is extremely surprising that the disadvantageous effects of the salvage process cheese could be reversed so as to provide a better product than the initial starting material.

Cheese samples were prepared by the technique of Examples 19 to 33 using various other surface-active agents and the following results were obtained:

TABLE V.—THE EFFECTS OF SURFACE-ACTIVE AGENTS 60 (PPM) ON MELT OF PROCESSED CHEESE CONTAINING 10% REWORK

| Ex. No. | Surface-active agent | Percent melt | |
|---|---|---|---|
| | | 3 weeks refrigeration | 2 months refrigeration |
| 34 | None | 7 | 0 |
| 35 | Di-2-ethylhexyl sodium sulfosuccinate | 58 | 25.8 |
| 36 | Polyoxyethylene (20) sorbitan monooleate | 24 | 18 |
| 37 | Mono- and diglycerides | 37 | 19 |
| 38 | Lecithin | 15 | 3 |

To test the effect of one of the invention's surface-active agents in a process cheese comprising 100% salvage process cheese, the following two examples were conducted.

EXAMPLE 39

The bowl of a Bradender Plastograph was adjusted to a temperature of 100° C. and the sigma blades rotated at 150 "envelopes" per minute. 500 gm. of good melt salvage process cheese was added. The salvage process cheese was cooked until it formed a typical cheese emulsion and then removed from the bowl and placed in 150 ml. glass beakers. The cheese was cooled and tested according to the procedure of Example 1 and found to have a melt of 29 and a Bloom of 255. The cheese in the slice was slightly brittle.

EXAMPLE 40

A cheese was prepared in accordance with the procedure of the preceding example, additionally comprising 2 gm. of polyoxyethylene(40) monostearate. The process spread was found to have a melt of 49 and a Bloom of 205. The cheese in the slice was not brittle and the viscosity of the cheese emulsion was lower, facilitating processing.

From the foregoing examples it is apparent that the melt is increased significantly at surface-active agent concentration as low as .00015% with process cheese containing good quality salvage process cheese. Moreover, any of the commonly used process cheese emulsifiers can be employed together with surface-active agents of this invention. The fact that these agents permit the incorporation of substantial quantities of salvage process cheese with the process cheese without inhibiting the fluidity thereof is of essential importance.

Other advantages apparent from the quantitative data include a slight fat separation which permits cheese slices to be easily separated, a reduced bloom, especially important with process cheese containing poor salvage process cheese, and an improved break and strength was observed in most examples.

As used herein, the term "mixing" is intended to mean low power input agitation or emulsification. Mixing equipment includes propeller stirrers, stirrer turbines as well as horizontal screw type agitators. Mixing equipment generally has low power requirements, in horsepower, ranging from about ⅛ horsepower for a ½–2 gal./batch mixer to 10 horsepower for a 1500–2000 gal./batch equipment (see Kirk-Othmer Encyclopedia of Chemical Technology, 2nd edition, vol. 8, page 143). Specific cheese cookers require horsepower inputs of 3 H.P. per 350 lbs., 5 H.P. per 550 lbs., and 7½ H.P. per 600 lbs. This type of equipment is included within the term low power input emulsification equipment. The mixing equipment used in the examples of this application also are low mechanical power input devices. By way of comparison, homogenizers and colloid mills are considered high power input emulsifiers (Kirk-Othmer, ibid, page 142).

All of the emulsifiers and surface-active agents of the invention are commercially obtainable except for some of the phosphorylated derivatives, an example for the preparation of which follows. The sodium phosphate emulsifying agent used was that disclosed in Example 1 of U.S. Pat. 3,097,949, issued July 13, 1963.

EXAMPLE 41

Preparation of phosphorylated stearoyl monoglyceride 107 gm. (0.3 mole) stearoyl monoglyceride and 60 gm. crude pyrophosphoric acid (prepared from the addition of 9 parts $P_2O_5$, 10 parts 85% $H_3PO_4$) were placed in a closed flask previously flushed with nitrogen and heated to 95° C. The mixture was agitated for 40 minutes while maintaining the temperature between 95° and 105° C. and then allowed to cool to room temperature and set aside for 3 days. The product was separated from the phosphoric acid by-product by washing with benzene and then dried to yield 94 gm. of phosphorylated stearoyl monoglyceride.

Although it is possible to phosphorylate the surface-active agents of the invention by reacting them with an equivalent of phosphorus pentoxide or phosphorus oxychloride, generally better results have been obtained when pyrophosphoric acid was used.

What is claimed is

1. A process for preparing a pasteurized process cheese containing from about 0.5% to about 100%, by weight, salvage cheese which has a consistency suitable for extruding in a substantially uniform size and weight and which falls within the legal limits of a "process cheese" as set up by the U.S. Department of Agriculture which process consists essentially of mixing with the aid of heat, and water of such quantity as to maintain the final product within the governmentally prescribed limits:

(I) from about 99.5% to about 0%, by weight, based on the weight of the total cheese requirement, of one or more raw cheeses of the same or different varieties in combination with an emulsifiably effective amount, up to the governmentally prescribed limit of a process cheese emulsifier selected from the group consisting of alkali metal phosphates, citrates and tartrates or mixtures thereof;

(II) from about 0.5% to about 100%, by weight, based on the weight of the total cheese requirement of salvage process cheese; and (III) from about 0.0003% to about 2%, by weight, based on the weight of the raw cheese and the salvage cheese of a surface-active agent selected from the group consisting of
 (a) phosphorylated substituted and unsubstituted sorbitan fatty acid monoesters and their alkali metal salts wherein the fatty acid contains from 12 to 18 carbon atoms;
 (b) phosphorylated substituted and unsubstituted polyoxyethylene sorbitan fatty acid esters and their alkali metals salts wherein the average monomer chain length is from 4 to 50 and the fatty acid contains from 12 to 18 carbon atoms;
 (c) polyoxyethylene fatty acid esters wherein the average monomer chain length is from 4 to 50 and the fatty acid contains from 12 to 18 carbon atoms;
 (d) alkyl and alkoxy substituted phosphates wherein the substituent contains from 12 to 18 carbon atoms;
 (e) substituted and unsubstituted monoglycerides wherein the fatty acid contains from 12 to 18 carbon atoms and the substituent is selected from the group consisting of acetylated tartaryl and phosphoryl; and
 (f) lecithin;
 (g) an alkali metal salt of $C_4$ to $C_{20}$ aliphatic esters of sulfosuccinic acid.

2. The process of claim 1 wherein the surface-active agent is present in an amount of from about 0.0003% to about 1% and the cheese contains from about .5 to 50% salvage process cheese.

3. The process of claim 1 wherein the surface-active agent is polyoxyethylene(40) monostearate.

4. The process of claim 1 wherein the surface-active agent is polyoxyethylene(20) sorbitan mono-oleate.

5. The process of claim 1 wherein the surface-active agent is sorbitan monostearate.

6. The process of claim 1 wherein the surface-active agent is lecithin.

7. The process of claim 1 wherein the surface-active agent is lactylic stearate.

8. The process of claim 1 wherein the surface-active agent is lard monoglyceride.

9. The process of claim 1 wherein the surface-active agent is acetylated tartrated vegetable fat monoglyceride.

10. The process of claim 1 wherein the surface-active agent is stearoyl monoglyceride.

11. The process of claim 1 wherein the surface-active agent is phosphorylated stearoyl monoglyceride.

12. The process of claim 1 wherein the surface-active agent is tris(phosphoryl) polyoxyethylene(20) sorbitan monolaurate.

13. The process of claim 1 wherein the surface-active agent is sodium palmitoyl sorbitan orthophosphate.

14. The process of claim 1 wherein the surface-active agent is di-2-ethylhexyl sodium sulfosuccinate.

15. The process of claim 1 wherein the surface-active agent is propoxylated lauryl polyphosphate.

16. The process as recited in claim 1 wherein said emulsifier is sodium aluminum phosphate.

17. The process as recited in claim 2 wherein said emulsifier is sodium aluminum phosphate.

18. The process as recited in claim 17 wherein said sodium aluminum phosphate is present in said raw cheese in an amount of from 0.5 to 3%, by weight.

References Cited

UNITED STATES PATENTS

| | | | |
|---|---|---|---|
| 3,244,535 | 4/1966 | Lauck et al. | 99—117 |
| 2,871,127 | 1/1959 | Barch et al. | 99—117 |
| 2,617,730 | 11/1952 | Long et al. | 99—117 |

FOREIGN PATENTS

| | | | |
|---|---|---|---|
| 407,461 | 3/1934 | Great Britain | 99—115 |

RAYMOND N. JONES, Primary Examiner

D. M. NAFF, Assistant Examiner

U.S. Cl. X.R.

99—117